(12) United States Patent
Gopal et al.

(10) Patent No.: US 8,189,626 B2
(45) Date of Patent: May 29, 2012

(54) SYSTEM AND METHOD FOR MULTICAST AND BROADCAST SYNCHRONIZATION IN WIRELESS ACCESS SYSTEMS

(75) Inventors: Thawatt Gopal, San Diego, CA (US); Jun Hu, San Diego, CA (US)

(73) Assignee: Future Wei Technologies, Inc., Plano, TX (US)

( * ) Notice: Subject to any disclaimer, the term of this patent is extended or adjusted under 35 U.S.C. 154(b) by 797 days.

(21) Appl. No.: 12/211,022

(22) Filed: Sep. 15, 2008

(65) Prior Publication Data

US 2009/0080406 A1 Mar. 26, 2009

Related U.S. Application Data

(60) Provisional application No. 60/974,365, filed on Sep. 21, 2007.

(51) Int. Cl.
*H04J 3/06* (2006.01)
(52) U.S. Cl. ........................ 370/509; 370/350
(58) Field of Classification Search ................ 370/509, 370/350, 342, 312, 315, 241, 336, 498, 310, 370/337; 455/436, 574
See application file for complete search history.

(56) References Cited

U.S. PATENT DOCUMENTS

| | | | |
|---|---|---|---|
| 5,883,888 A | | 3/1999 | St-Pierre |
| 6,359,876 B1 * | | 3/2002 | Kamata .................. 370/342 |
| 6,449,290 B1 | | 9/2002 | Willars et al. |
| 6,487,187 B1 * | | 11/2002 | Schmutz et al. ............. 370/337 |
| 7,082,302 B1 * | | 7/2006 | Maitland et al. ............. 455/436 |
| 7,085,294 B2 * | | 8/2006 | Longoni et al. ............. 370/509 |
| 2005/0143145 A1 * | | 6/2005 | Maekawa .................. 455/574 |
| 2006/0105703 A1 | | 5/2006 | Takizawa et al. |
| 2008/0069019 A1 * | | 3/2008 | Fahldieck ................... 370/310 |
| 2008/0089265 A1 * | | 4/2008 | Park et al. ................... 370/312 |
| 2008/0146213 A1 | | 6/2008 | Kim et al. |
| 2008/0212516 A1 * | | 9/2008 | Son et al. .................... 370/315 |
| 2008/0259905 A1 * | | 10/2008 | Connors et al. ............. 370/350 |
| 2009/0103569 A1 * | | 4/2009 | Cho et al. ................... 370/498 |
| 2010/0220597 A1 * | | 9/2010 | Ji et al. ...................... 370/241 |
| 2011/0002310 A1 * | | 1/2011 | Mori et al. .................. 370/336 |

FOREIGN PATENT DOCUMENTS

| | | |
|---|---|---|
| CN | 1182341 A | 5/1998 |
| CN | 1253700 A | 5/2000 |
| CN | 1260921 A | 7/2000 |
| CN | 101043265 A | 9/2007 |
| WO | WO 01/47289 A2 | 6/2001 |
| WO | WO 2009/039789 A1 | 4/2009 |

OTHER PUBLICATIONS

Faria, et al., "DVB-H: Digital Broadcast Services to Handheld Devices," Proceedings of the IEEE, Jan. 2006, vol. 94, No. 1, pp. 194-209.
"Written Opinion of the International Searching Authority," International Application No. PCT/CN2008/072451, mailing date: Jan. 8, 2009, 5 pages.

* cited by examiner

*Primary Examiner* — Kwang B Yao
*Assistant Examiner* — Syed M Bokhari
(74) *Attorney, Agent, or Firm* — Slater & Matsil, L.L.P.

(57) ABSTRACT

In a method for multicast and broadcast synchronization a data payload frame is generated from a data payload. A frame number is assigned to the data payload frame, wherein the frame number includes a generating time of the data payload frame. The data payload frame is distributed to a plurality of base stations in a wireless access system. The offset spans a travel time of a data payload frame from the controller to the plurality of base stations as well as a scheduling time and a multiplexing time.

31 Claims, 7 Drawing Sheets

SYSTEM AND METHOD FOR MULTICAST AND BROADCAST SYNCHRONIZATION IN WIRELESS ACCESS SYSTEMS

This application claims the benefit of U.S. Provisional Application No. 60/974,365, filed on Sep. 21, 2007, entitled "Synchronization Method for Macro-Diversity Transmission in Multicast-Broadcast Services in OFDMA Wireless Access Systems," which application is hereby incorporated herein by reference.

TECHNICAL FIELD

The present invention relates generally to a system and method for wireless communications, and more particularly to a system and method for multicast and broadcast synchronization in wireless access systems.

BACKGROUND

In general, multicast and broadcast service (MBS) is a mechanism for distribution of multicast (source to multiple recipients) and broadcast (source to all recipients) data (MBS data) content across multiple base stations (BS) from a centralized server to mobile stations (MS) in a manner that may take advantage of orthogonal frequency division multiple access (OFDMA) macrodiversity. An aim of macrodiversity is to combat fading and to increase received signal strength.

In OFDMA systems, radio resources consist of subcarriers (resources in a frequency domain) and OFDMA symbols (resources in a time domain), with an OFDMA frame including several OFDMA symbols and a resource allocation of one or more subcarriers. In order to achieve macrodiversity in OFDMA systems with a configuration commonly referred to as single frequency network (SFN), whereby all BS in a MBS zone are transmitting on the same carrier frequency, MBS data in the MBS zone needs to be transmitted using the same set of subcarriers and with a time occurrence within an OFDMA frame that is the same for all BS, i.e., the MBS data transmitted by the BS occupies the same OFDMA symbol locations within the OFDMA frame as well as the same number of OFDMA symbols.

Since MBS data sent on the frequency domain in an OFDMA system is already orthogonal, the time domain portion of the requirement for macrodiversity may be achieved by synchronously transmitting the MBS data from multiple BS. By transmitting the MBS data from the multiple BS at the same time (as specified by the OFDMA symbol locations within the OFDMA frame and the number of OFDMA symbols), the energy of the MBS data transmission from each BS may be combined over the air such that the combined energy is at least equal to or greater than the energy from only a single BS. This is expressible as $$\sum_{i=1}^{M} E_i \geq E_X$$

where $X \in \{1, 2, 3, \ldots, M\}$ represents any one of M BS in the MBS zone, $E_i$ represents a received energy from a BS at a MS, whereby the summation is valid if and only if the MBS data was transmitted using exactly the same subcarriers and location in time as specified via the OFDMA symbol locations in the OFDMA frame. Furthermore, the energy from a BS must arrive at the MS within a guard interval period, which in OFDMA technology is referred to as a cyclic prefix interval.

The use of multiple antennas in wireless systems is not to be confused with the macrodiversity benefit in OFDMA systems supporting MBS. Macrodiversity in OFDMA systems supporting MBS may occur when using single or multiple antennas, but the use of multiple antennas is not a requirement for macrodiversity combining in OFDMA systems supporting MBS.

Macrodiversity may also require synchronization from a MBS server all the way to the BS transmitting within the single MBS zone. However, synchronization of BS operating in the single MBS zone may be difficult to achieve since the BS operating in the single MBS zone may be distributed across a large geographical area. Additionally, the BS may be connected using different transport mediums (e.g., E1/T1, OC3, satellite, and so forth). Therefore, the MBS data sent from the MBS server to the BS may arrive at the BS at different times due to different capabilities of the different transport mediums, media access control mechanisms, and so forth.

Figure 1A:
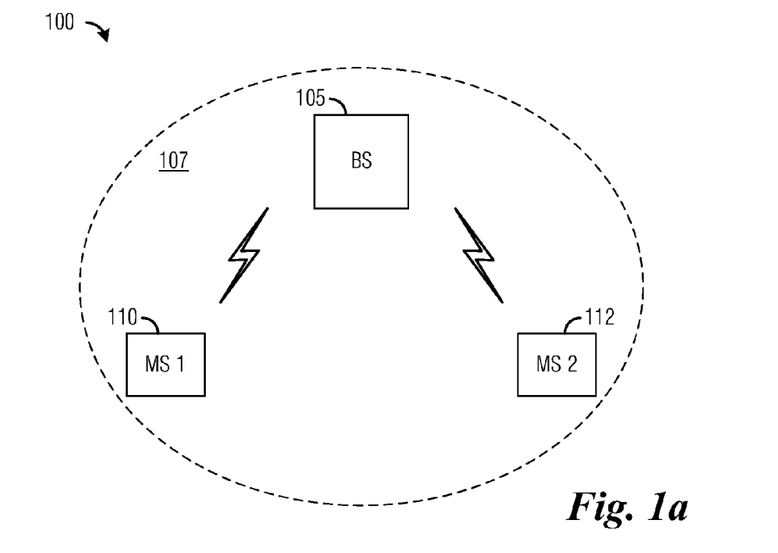
FIG. 1a is a diagram of a communications system.

FIG. 1a illustrates a portion of a communications system 100 including a base station BS 105. BS 105 may have a coverage area 107. Operating in coverage area 107 may be mobile station 'MS 1' 110 and a mobile station 'MS 2' 112. BS 105 may be used to coordinate communications to and from MS 1 110 and MS 2 112. Since there is only one base station, transmissions to BS 105 and from BS 105 may not take advantage of macrodiversity.

Figure 1B:
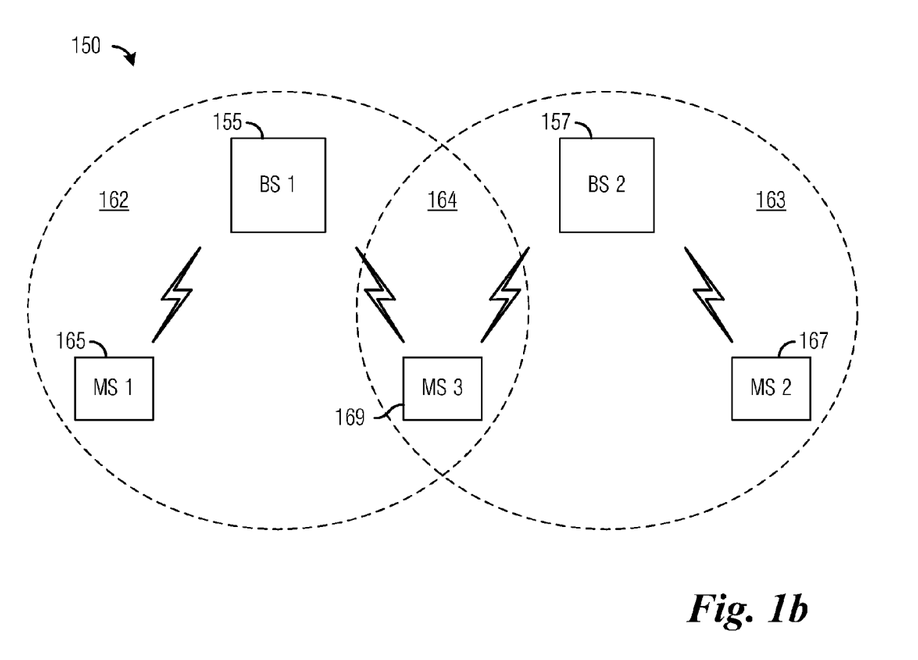
FIG. 1b is a diagram of a communications system with macrodiversity capability.

FIG. 1b illustrates a portion of a communications system 150 including a base station 'BS 1' 155 and a base station 'BS 2' 157. BS 1 155 may have a coverage area 162, while BS 2 157 may have a coverage area 163. There may be some overlap in coverage areas 162 and 163 (shown as overlap area 164). Operating in coverage area 162 may be mobile station 'MS 1' 165 and in coverage area 163 may be mobile station 'MS 2' 167. Mobile station 'MS 3' 169 may be operating in both coverage areas 162 and 163 (i.e., MS 3 169 may be operating in overlap area 164).

BS 1 155 may transmit to and receive transmissions from MS 1 165 and MS 3 169, while BS 2 157 may transmit to and receive transmissions from MS 2 167 and MS 3 169. Furthermore, if BS 1 155 and BS 2 157 transmit the same data payload using the same format in a synchronized manner as described previously, MS 3 169 may be able to exploit macrodiversity by receiving transmissions from both BS 1 155 and BS 2 157.

SUMMARY OF THE INVENTION

These and other problems are generally solved or circumvented, and technical advantages are generally achieved, by embodiments of a system and a method for multicast and broadcast synchronization in wireless access systems.

In accordance with an embodiment, a method for transmission synchronization in a wireless access system having a controller and a plurality of base stations is provided. The method includes generating a data payload frame from a data payload, assigning a frame number to the data payload frame, and distributing the data payload frame with the frame number to the plurality of base stations in the wireless access system. The frame number comprises a generating time of the data payload frame, and the offset spans a transfer time of a data payload frame from the controller to the plurality of base stations.

In accordance with another embodiment, a method for transmission synchronization in a wireless access system having a controller and a plurality of base stations is provided. The method includes, at each base station in the plurality of base stations, receiving from the controller, a data payload frame having a frame number comprising a generating time of the data payload frame, combining an offset to the frame number of the data payload frame in response to determining that the frame number comprises only the generating time, and transmitting the data payload frame at a transmission time determined from the frame number of the data payload frame. The offset spans a transfer time of a data payload frame from the controller to the plurality of base stations.

In accordance with another embodiment, a method for transmission synchronization in a wireless access system having a controller, a gateway, and a plurality of base stations is provided. The method includes, at the gateway, receiving from the controller, a data payload frame having a frame number comprising a generating time of the data payload frame, combining an offset to the frame number of the data payload frame in response to determining that the frame number comprises only the generating time, and distributing the data payload frame with the frame number to the plurality of base stations in the wireless access system. The offset spans a transfer time of a data payload frame from the controller to the plurality of base stations.

In accordance with another embodiment, a method for determining an offset in a wireless access system having a controller, a server, a gateway, and a plurality of base stations is provided. The method includes measuring a first part of the offset, selecting a base station from the plurality of base stations, measuring a second part of the offset, and replacing a saved second part of the offset with the measured second part of the offset in response to determining that the measured second part of the offset is greater than the saved second part of the offset. The method also includes repeating the selecting, the measuring a second part, and the replacing for remaining base stations in the plurality of base stations, and computing the offset from the first part of the offset and the saved second part of the offset. The first part of the offset spans a transfer time of a data payload frame from the controller to the gateway, while the second part of the offset spans a transfer time of a data payload frame from the gateway to the selected base station.

An advantage of an embodiment is that synchronization of multicast and broadcast transmissions of a MBS payload of a MBS system in a MBS zone is guaranteed by referencing an arrival time of the MBS payload, which is available by referencing a reference time. Computation of a transmission time is a simple computation using the arrival time and may be performed at a variety of places in the MBS system. Furthermore, the computing of the transmission time at several possible places may enable a reduction in network overhead traffic in the MBS system since it may not be necessary to transmit the MBS payload with full transmission time information throughout the MBS system.

A further advantage of an embodiment is that static or dynamic behavior is supported and the selection of static or dynamic behavior may be made depending on factors such as performance requirements and computational resource availability.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an OFDMA wireless access system supporting multicast/broadcast and macrodiversity. The invention may also be applied, however, to other forms of wireless access systems, both supporting and not supporting multicast/broadcast transmissions and supporting and not supporting macrodiversity, wherein synchronization of transmissions may be important.

Figure 2A:
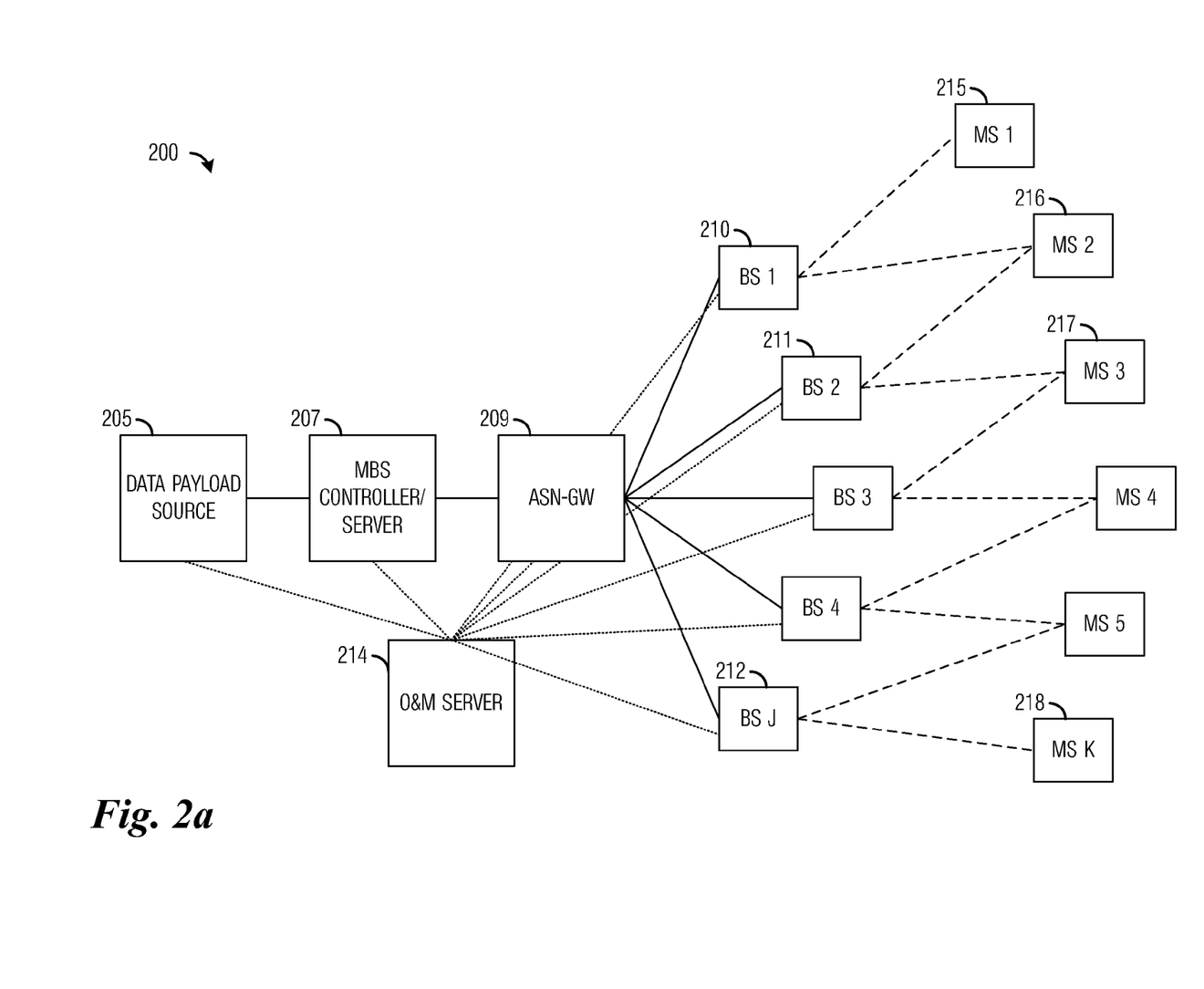
FIG. 2a is a diagram of an OFDMA wireless access system.

With reference now to FIG. 2a, there is shown a diagram illustrating an OFDMA wireless access system 200. As shown in FIG. 2a, wireless access system 200 supports multicast/broadcast and macrodiversity and may form a single MBS zone. Wireless access system 200 may be a part of a larger wireless access system or it may be a complete standalone communications system.

Wireless access system 200 includes a data payload source 205 that may be used to process registered IP traffic into compliant data streams. For example, data payload source 205 may be an Internet Protocol (IP) encapsulator that may convert registered IP traffic, also referred to as services, into digital video broadcasting-handheld (DVB-H) compliant MPEG-2 asynchronous serial interface (ASI) data streams. Alternatively, the data payload source may be a content provider of a multicast/broadcast service. Additional examples of a data payload source may include data/multimedia/information servers, video cameras, DVD players, music players, sensors providing information, and so forth.

Wireless access system 200 also includes a MBS controller/server 207 that may be used to control the multicast and broadcast transmission of a data payload in wireless access system 200. MBS controller/server 207 may perform operations such as generate data payload frames from data streams provided by data payload source 205, generate data payload frame numbers for the data payload frames for use in synchronizing the multicast/broadcast of the data payload frames, measure propagation delays of transmissions between various points in wireless access system 200, and so forth.

Wireless access system 200 further includes an access service network gateway (ASN-GW) 209. ASN-GW 209 may be used as a relaying function and receives payload data units (PDUs), i.e., data payload frames, from MBS controller/server 207 and transmits the data payload frames to base stations in wireless access system 200. Additionally, ASN-GW 209 may be used in measuring propagation delays of transmissions between various points in wireless access system 200. ASN-GW 209 may also be used to complete the generation of a frame number for the data payload frame. For example, ASN-GW 209 may transmit the data payload frames from MBS controller/server 207 to base stations, such as BS 1 210, BS 2 211, and BS J 212, among others.

The base stations may then wirelessly transmit the data payload frames to mobile stations. For example, BS 1 210 may transmit the data payload frames to MS 1 215 and MS 2 216, BS 2 211 may transmit the data payload frames to MS 2 216 and MS 3 217, while BS J 212 may transmit the data payload frames to MS K 218, among others.

Wireless access system 200 further includes an operation and maintenance (O&M) server 214. O&M server 214 may be used to provide operational and management information and functions to wireless access system 200. O&M server 214 may be coupled to data payload source 205, MBS controller/server 207, ASN-GW 209, BS 210-212, and so forth.

As discussed previously, in order to effectively implement macrodiversity, the base stations of wireless access system 200 (collectively a single MBS zone) must transmit the same data payload frames (MBS data) using the same format across the same frequency resources (e.g., number of subcarrier locations used) and with the same time resources (e.g., locations of the data specified by OFDMA symbol locations in an OFDMA frame and number of OFDMA symbols). Therefore, synchronizing the transmissions of the base stations may be critical to properly achieving macrodiversity. However, the base stations in wireless access system 200 may be distributed over a large geographical area and may be connected to ASN-GW 209 using a variety of different transport mediums with different data rate capabilities, for example, E1/T1, OC3, satellite, wireless, and so forth. Furthermore, the different transport mediums may use different media access control (MAC) mechanisms and may therefore differ in the way that they handle quality of service (QoS) constraints. For example, E1/T1 is based on time-division multiple access (TDMA), while Ethernet is based on carrier sense multiple access with collision detection (CSMA/CD). TDMA and CSMA/CD have significantly different MAC mechanisms that may result in different delays in the transport of the MBS data. This may be in addition to the different data rate capabilities. Therefore data payload frames leaving ASN-GW 209 at substantially the same time may arrive at the base stations at different times.

Figure 3A:
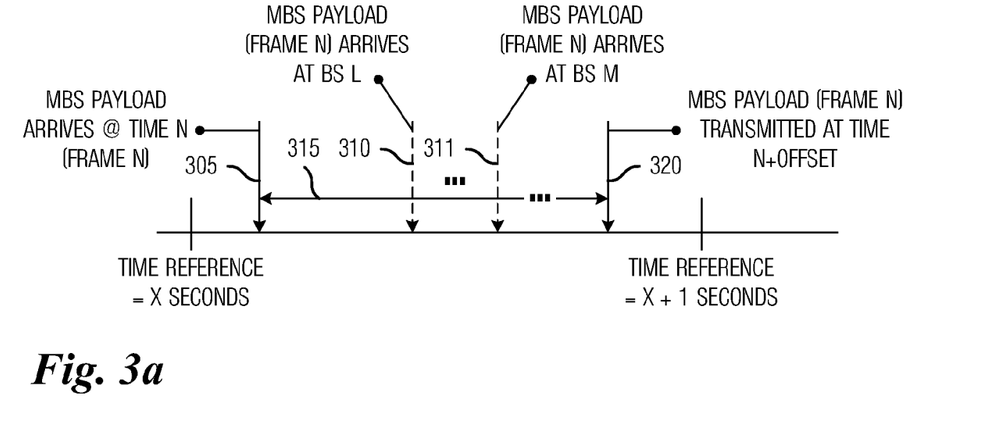
FIG. 3a is a time-space diagram of the effect of different transmission transfer rates on data payload frames.

FIG. 3a is a time-space diagram illustrating the effect of different transmission transfer rates as well as different MAC mechanisms on data payload frames transmitted to a number of base stations. As shown in FIG. 3a, as a data payload arrives at an MBS controller/server, such as MBS controller/server 207, MBS controller/server 207 may create data payload frames from the data payload and assign a frame number to the data payload frames. Alternatively, the data payload may already be in the form of data payload frames when it is received by MBS controller/server 207. According to a preferred embodiment, MBS controller/server 207 may assign a frame number based on when the data payload frame is generated (or received). For example, if a data payload frame is generated at time N, then MBS controller/server 207 may assign the data payload frame a frame number that includes a value that is a function of time N.

The value (a reference time portion of the frame number) may be a time that is relative to a reference time source that may be used by MBS controller/server 207. For example, MBS controller/server 207 may be using a global positioning system (GPS) time as the reference time source. The GPS time may be a one pulse per second (1 PPS) time reference, wherein the GPS time provides a single reference pulse once every second. Therefore, if MBS controller/server 207 is using the GPS time as the reference time source, then the reference time portion may be relative to pulses being provided once every second by the GPS time. If, for example, a data payload frame is generated at an absolute time of 9:02:01.223 (hours:minutes:seconds format), then the reference time portion may be equal to 223 (the fractional portion of the seconds part of the absolute time that the data payload frame was generated). In addition to the GPS time, MBS controller/server 207 may use other reference time sources, including reference time sources utilizing network time protocol (NTP), coordinated universal time (UTC), system clocks present in cellular telephone systems, other satellite positioning systems' system clocks, atomic clocks, and so forth.

For discussion purposes, let MBS controller/server 207 generate a data payload frame (frame N) at time N (shown in FIG. 3a as time event 305). As discussed previously, the reference time portion of a frame number assigned to frame N may be based on time N and may be a relative time, for example, the reference time portion may be relative to a whole second indicator pulse provided by the GPS time. After MBS controller/server 207 generates frame N, frame N may be transferred to base stations in a wireless access system, such as wireless access system 200. The frame N may first be transferred to an ASN-GW, such as ASN-GW 209, prior to being transferred to the base stations. Since the base stations of wireless access system 200 may be distributed over a large geographical area and may be connected to ASN-GW 209 with different transport mediums with different data rate capabilities as well as different MAC mechanisms, the frame N may arrive at the various base stations at different times. For example, the frame N may arrive at a base station 'BS L' at a first time (shown as time event 310) and at a base station 'BS M' at a second time (shown as time event 311). As shown in FIG. 3a, time event 310 may represent a shortest transfer time for the frame N and time event 311 may represent a longest transfer time for the frame N.

As discussed herein, a transfer time of a data payload frame may comprise: a scheduling time (a wait time spent in queues, et cetera), a multiplexing time (a time spent accumulating a sufficient number of transmission packets prior to transmission in order to produce a single packet of desired size), and a travel time (a time that the data payload frame actually spends in the transport medium). In general, the transfer time of a data payload packet may be defined as a time interval between a generation of the data payload packet and when the data payload packet arrives at its entirety at a base station. Arrival times to other base stations in wireless access system 200 may fall somewhere in between time event 310 and time event 311, therefore, their transfer times may fall in between the shortest transfer time and the longest transfer time.

An offset 315 may span a time period exceeding the longest transfer time for the frame N, which may be computed as a difference between time event 311 and time event 305. Since offset 315 may be greater than the longest transfer time for the frame N between when the frame N was generated at MBS controller/server 207 and when the frame N may be received by a final base station, if the base stations in wireless access system 200 are instructed to transmit the frame N to the mobile stations at a time substantially equal to the time when the frame N may be generated by MBS controller/server 207 (time N) plus offset 315, then transmission of the frame N to the mobile stations by the base stations may be substantially synchronized.

If the base stations use the same reference time source, such as the GPS time, or some other reference time source, as MBS controller/server 207, the transmissions of the frame N by the base stations may be referencing a common time and problems associated with maintaining time/clock synchrony, such as clock drift, clock distribution difficulties, and so forth, may be eliminated.

Offset 315 may be defined in terms of data payload frame transmissions rather than actual time values, such as milliseconds. For example, offset 315 may have a value of four (4), indicating that offset 315 may be equal to a time required to transmit four (4) data payload frames.

Offset 315 may be computed a priori and stored for subsequent use. For example, offset 315 may be computed during a setup or configuration stage of wireless communication system 200 or when additional hardware (for example, additional base station(s) or mobile station(s)) is added. Alternatively, offset 315 may be computed dynamically while wireless access system 200 is being used. The dynamic computation of offset 315 may be performed periodically or when a specified event occurs. Examples of specific events may include: a specified time, measured performance metrics exceed or fall below a threshold, prior to a start of a multicast/broadcast event, and so on. Offset 315 may be stored in a memory of a component of wireless access system 200 that may be used to combine offset 315 to the reference time portion of the frame number or offset 315 may be provided to the component of wireless access system 200 that may be used to combine offset 315 to the reference time portion of the frame number via a message from a component used to manage offset 315.

Figure 3B:
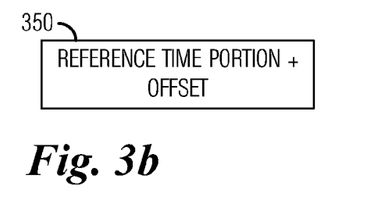
FIGS. 3b and 3c are diagrams of different frame number formats.
Figure 3C:
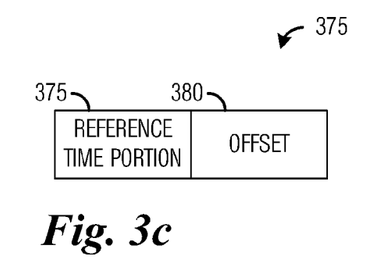

FIG. 3b is a diagram illustrating a frame number 350 for a data payload frame. Each data payload frame may be marked with a frame number that may be used to indicate a transmit time (from the base stations to the mobile stations of wireless access system 200) of the data payload frame. Frame number 350 may be an example of a frame number for a data payload frame. Frame number 350 for the data payload frame may be a sum of a reference time portion (e.g., a value that is based on the time N when the data payload frame was generated (or received) by MBS controller/server 207) and an offset, such as offset 315, representing a time value about equal to a longest transfer time for a data payload frame from MBS controller/server 207 to a base station. FIG. 3c is a diagram illustrating a frame number 375, wherein frame number 375 is created by concatenating a reference time portion 375 with an offset portion 380.

In addition to offset 315 being at least equal to the longest transfer time, the offset 315 may also include an additional time. The additional time in addition to the longest transfer time may be present to help take into account an unexpected delay occurring in the transfer of the data payload frame. For example, offset 315 may be about equal to the longest transfer time plus forty (40) percent of the longest transfer time, wherein the 40% is the additional time for unexpected delays. A typical range of values for the additional time for unexpected delays may be from 30% to 50% of the longest transfer time. According to a preferred embodiment, the reference time portion (e.g., the value that is based on the time N) of frame number 350 may be generated when the data payload frame is generated (or received) at MBS controller/server 207, while the offset portion of frame number 350 may be added at MBS controller/server 207 or at one or several other points in wireless communications network 200, such as at ASN-GW 209 or at a base station, prior to transmission to the mobile stations.

Turning back to FIG. 2a, as the data payload frames arrive at the base stations, each data payload frame may have a frame number with at least time information, i.e., the data payload frames may contain a frame number with a reference time portion that is a function of the time when they were generated (or received) by MBS controller/server 207. If the frame numbers do not have an offset, such as offset 315, added or concatenated then offset 315 may be added to or combined concatenated with the frame number at the base stations. The data payload frames may then be inserted into a transmission queue for transmission. The data payload frames may be placed in the transmission queue based on their frame number.

Figure 4:
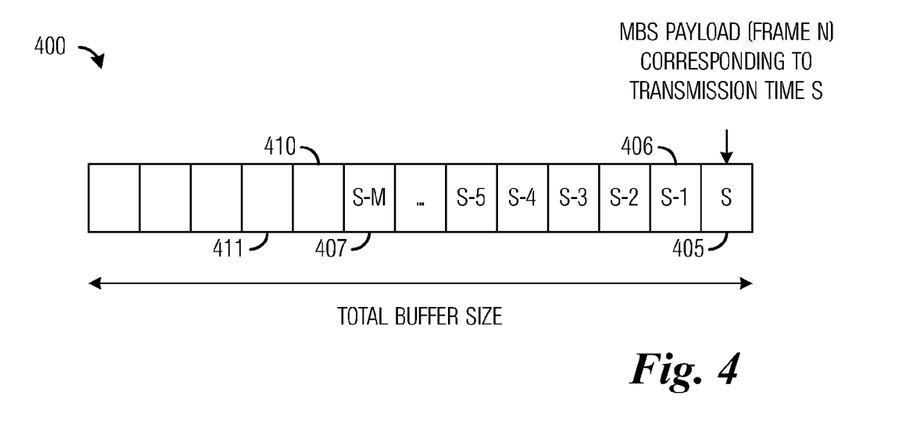
FIG. 4 is a diagram of a frame buffer.

FIG. 4 is a diagram illustrating a transmission queue 400. Transmission queue 400 may be representative of a transmission queue located in a base station of wireless access system 200. Transmission queue 400 includes a number of memory slots, such as memory slot 405, memory slot 406, memory slot 407, memory slot 410, and memory slot 411. A memory slot may be sized to hold a data payload frame. Alternatively, a memory slot may be sized to hold a pointer to a data payload frame, which may be stored in a memory in the base station. In yet another alternative, a memory slot may be sized to hold a frame number of a data payload frame with the data payload frames stored in a memory.

The content of transmission queue 400 may be arranged based on transmission time, i.e., the frame number of the data payload frames. For example, memory slot 405 may be used to store a data payload frame (or pointer or frame number) to be transmitted at time S (with S=reference time portion+offset), while memory slot 406 may be used to store a data payload frame (or pointer or frame number) to be transmitted at time S−1. Then, at time S, the base stations may transmit the data payload frame contained in memory slot 405 to the mobile stations. As with the value of offset 315, the transmission time may be specified in data payload frame transmission times rather than actual time values. The content of transmission queue 400 may increase and decrease as data payload frames are received and transmitted. Therefore, some of the memory slots, such as memory slot 410 and memory slot 411, of transmission queue 400 may be empty at least temporarily.

The size of transmission queue 400 may be dependent on the nature of wireless communications network 200. For example, for an OFDMA wireless communications network with a maximum data burst of 6000 bytes and assuming a communications protocol overhead of about 10%, each memory slot of transmission queue 400 may need to hold 6600 bytes in order to store a complete data payload frame. A worse case analysis may show that it is necessary to store approximately one second's worth of data payload frames (200 data payload frames), therefore transmission queue 400 may need to be 1.32 megabytes in size. A more conservative estimate may predict that one-half of a second's worth of data payload frames (100 data payload frames) may be sufficient, therefore transmission queue 400 may need to be 660 kilobytes in size.

Turning back to FIG. 2a, an important requirement in multicast/broadcast applications may be that the data payload frames be played in a proper order (sequence) to ensure the integrity of the data. For example, data payload frames containing video or music played out of order may ruin the content of the multicast/broadcast. However, the data payload contained within the data payload packets may already contain ordering (sequencing) information, so additional ordering or sequencing information in the data payload packets may not be needed. Additionally, the addition of ordering information may help to decrease efficiency due to increased overhead. This may eliminate a need to add additional ordering information, other than the transmission time information in the frame numbers.

Figure 2B:
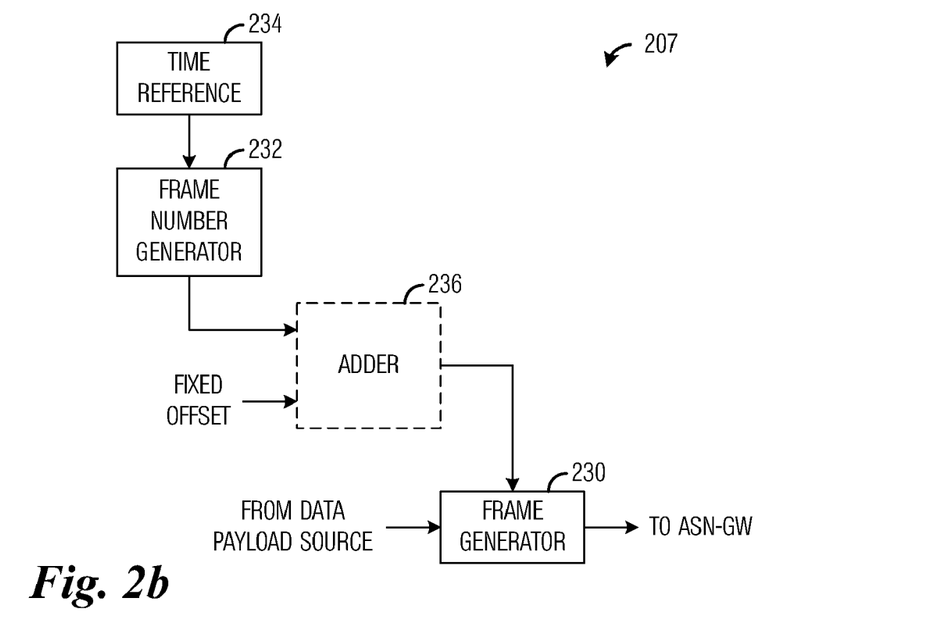
FIG. 2b is a diagram of a portion of a MBS controller/server.

FIG. 2b is a diagram illustrating a portion of a MBS controller/server, such as MBS controller/server 207. As discussed previously, MBS controller/server 207 may be used to create data payload frames from a data payload provided to MBS controller/server 207 by a data payload source, such as data payload source 205. Alternatively, MBS controller/server 207 may receive data payload frames already created by data payload source 205. Furthermore, MBS controller/server 207 may create a frame number for each data payload frame created (or received) by MBS controller/server 207. A frame number created by MBS controller/server 207 may include at least a value that is based on a time corresponding to a time that MBS controller/server 207 created (or received) the data payload frame, i.e., the time reference portion of the frame number. The frame number may also include an offset, such as offset 315, that may correspond to a longest transfer time of a data payload frame from MBS controller/server 207 to mobile stations. Offset 315 may also include an additional time period that may help to compensate for an unexpected delay in the transfer of the data payload frame.

As discussed above, the value that may be included in the time reference portion of the frame numbers created by MBS controller/server 207 may be a relative time, relative to a reference time source, such as the GPS time. The relative time may be relative to a pulse provided by the GPS time each second, for example. Furthermore, offset 315 may be specified in terms of data payload frame transmission times rather than an absolute time value.

MBS controller/server 207 includes a frame generator 230 that may be used to create data payload frames from the data payload provided by data payload source 205. Frame generator 230 may partition the data payload into multiple parts of appropriate size and then combine each of the parts with a frame number to generate a data payload frame. The frame number may be generated by a frame number generator 232 that may be coupled to a time reference unit 234. Time reference unit 234 may include a receiver capable of receiving a reference time from a reference time source, such as the GPS time. Time reference unit 234 may provide to frame number generator 232 a time value that may be resynchronized each time that time reference unit 234 receives a pulse from the GPS time. The time value may be used by frame number generator 232 to generate the time reference portion of frame numbers. In an alternative embodiment, time reference unit 234 may provide to frame number generator 232 a relative time value relative to the pulses provided each second by the GPS time, for example. In yet another alternative embodiment, time reference unit 234 may be an internal timing source, such as a counter coupled to a clock.

If the frame numbers generated by MBS controller/server 207 also include offset 315, then MBS controller/server 207 may include an adder 236 that may be used to add offset 315, which may be stored in a memory, to the frame number provided by frame number generator 232. If the frame numbers generated by MBS controller/server 207 do not include offset 315, then MBS controller/server 207 may not include adder 236. The frame number may then be provided to frame number generator 232, which may combine the frame number with a part of the data payload and create a data payload frame. The data payload frames, complete with frame numbers, may then be provided to an ASN-GW, such as ASN-GW 209. In an alternative embodiment, the frame number may be created by concatenating offset 315 with the frame number provided by frame number generator 232. Therefore, a concatenation unit may be used in place of the adder 236.

Figure 2C:
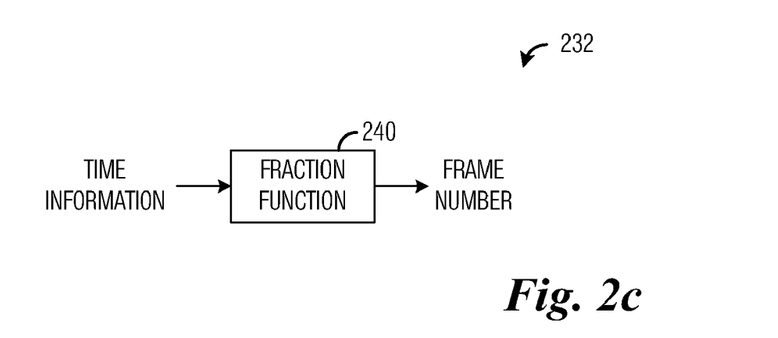
FIG. 2c is a diagram of a frame number generator.

FIG. 2c is a diagram illustrating a frame number generator, such as frame number generator 232. Time reference unit 234 may provide to the frame number generator a time value that may be resynchronized each time that time reference unit 234 receives a pulse from the GPS time. Frame number generator 232 may then perform a mathematical operation to derive a relative time from the time information received from time reference unit 234. For example, frame number generator 232 may perform a fractional operation 240 on the time information received from time reference unit 234. For example, if time reference unit 234 provides to frame number generator 232 a time value of 12:35:12.345 (hours:minutes:seconds format), then frame number generator 232 may perform the mathematical operation on the seconds part of the time value, such as fractional_portion_function (12.345), with the result being 345. The time reference portion of the frame number may then be 345. In an alternative embodiment, time reference unit 234 may provide to frame number generator 232 an integer value representing the time value in milliseconds, for example, then time reference unit 234 may perform a modulo operation with the modulus being equal to the number of milliseconds in a second (1000) to extract the fractional portion of the time value, resulting in the time reference portion of the frame number.

Figure 2D:
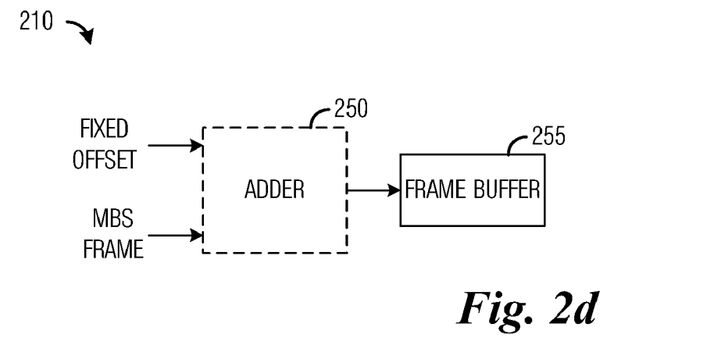
FIG. 2d is a diagram of a portion of a base station.

FIG. 2d is a diagram illustrating a portion of a base station, such as base station 210. As discussed above, the frame number of a data payload frame may or may not include an offset, such as offset 315, when the data payload frame arrives at base station 210. If the frame number of the data payload frame already includes offset 315, then base station 210 may insert the data payload frame into a frame buffer 255 at an appropriate position.

However, if the frame number of the data payload frame does not include offset 315, then base station 210 may need to combine offset 315 with the frame number prior to inserting the data payload frame into frame buffer 255. Base station 210 may have been provided the offset 315 during configuration or by way of a message from O&M server 214, MBS controller/server 207, or ASN-GW 209. Base station 210 may include an adder 250 that may be used to add offset 315 to the frame number of the data payload frame. After adding offset 315, the frame number of the data payload frame may be complete and the data payload frame may be inserted into frame buffer 255. In an alternative embodiment, offset 315 may be concatenated to the frame number rather than added to the frame number.

In one embodiment, wireless access network 200 includes a controller coupled to a data payload source. The controller generates data payload frames from a data payload provided by the data payload source and a frame number for each data payload frame. The frame number includes at least a time value based on a frame generation time for the data payload frame.

A gateway is coupled to the controller. The gateway distributes data payload frames received from the controller. A plurality of base stations is coupled to the gateway. The base stations transmit data payload frames from the gateway at substantially the same transmission time specified by the frame number of each data payload frame. A plurality of mobile stations are coupled to the plurality of base stations, with each mobile station coupled to at least one base station. Each mobile station receives data payload frames from at least one base station.

The controller also combines an offset with the frame generation time in each frame number, wherein the offset spans a transfer time of a data payload frame from the controller to the plurality of base stations, the offset is greater than any single transfer time of a data payload frame from the controller to a base station in the plurality of base stations. The controller includes a frame generator that produces data payload frames from the data payload, a time reference unit that provides a time value, and a frame number generator coupled to the time reference unit and to the frame generator. The frame number generator provides a time value based on a generation time for each data payload frame produced by the frame generator, wherein the generation time corresponds to a time when the data payload frame was produced by the frame generator. An adder is coupled between the frame generator and the frame number generator. The adder adds the offset to the frame number produced by the frame number generator.

Each base station in the plurality of base stations also combines an offset with the frame generation time in each frame number, wherein the offset spans a transfer time of a data payload frame from the controller to the plurality of base stations. Each base station includes an adder that adds the offset to a frame number of a data payload frame; and a frame buffer coupled to the adder. The frame buffer stores the data payload frames in order according to their frame numbers.

Figure 5A:
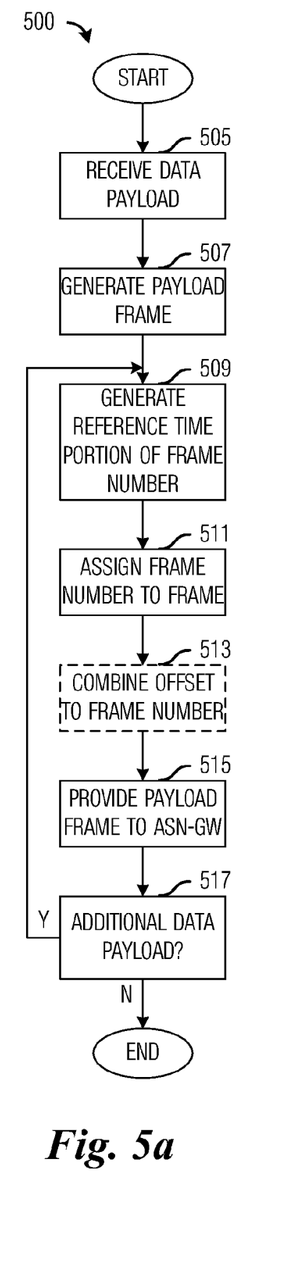
FIG. 5a is a flow diagram of a sequence of events in the generation of data payload frames at a MBS controller/server.

FIG. 5a is a flow diagram illustrating a sequence of events 500 in the generation of data payload frames at a MBS controller/server, such as MBS controller/server 207. The generation of payload frames at MBS controller/server 207 may be descriptive of events occurring in MBS controller/server 207 as MBS controller/server 207 receives a data payload, generates data payload frames with frame numbers, and then begins distributing the data payload frames with frame numbers for multicast/broadcast to recipients. The generation of data payload frames may continue as long as MBS controller/server 207 receives a data payload and may not stop until the data payload is stopped or until MBS controller/server 207 is powered down, reset, fails, or so on.

The generation of data payload frames may begin with MBS controller/server 207 receiving a data payload (block 505). The data payload may be provided by a data payload source, such as data payload source 205. As MBS controller/server 207 receives the data payload, it may begin generating data payload frames (block 507). MBS controller/server 207 may generate data payload frames by partitioning the data payload into appropriately sized parts. In addition to partitioning the data payload into parts, MBS controller/server 207 may generate a reference time portion of a frame number to be assigned to each data payload frame (block 509). A frame number may be assigned to each data payload frame (block 511). Each data payload frame's frame number may have a reference time portion containing a value based on a time that the data payload frame was created. The reference time portion may contain a relative time, relative to a reference time source, such as the GPS time.

MBS controller/server 207 may be used to combine an offset, such as offset 315, with the reference time portion of the frame number. Offset 315 may be combined with the reference time portion by MBS controller/server 207 or by other network components. If offset 315 is to be combined with the reference time portion by MBS controller/server 207, then MBS controller/server 207 may combine (e.g., add or concatenate) offset 315 and the reference time portion (block 513).

After the frame number (with or without offset 315) has been assigned to a data payload frame, the data payload frame may be provided to an ASN-GW, such as ASN-GW 209 (block 515). ASN-GW 209 may be used to distribute the data payload frames to base stations. After providing the data payload frame to ASN-GW 209, MBS controller/server 207 may check to determine if there is additional data payload (block 517). If there is additional data payload, then MBS controller/server 207 may continue by generating data payload frames and assigning additional frame numbers to the data payload frames. If there is no more data payload, then the generation of data payload frames may terminate.

Figure 5B:
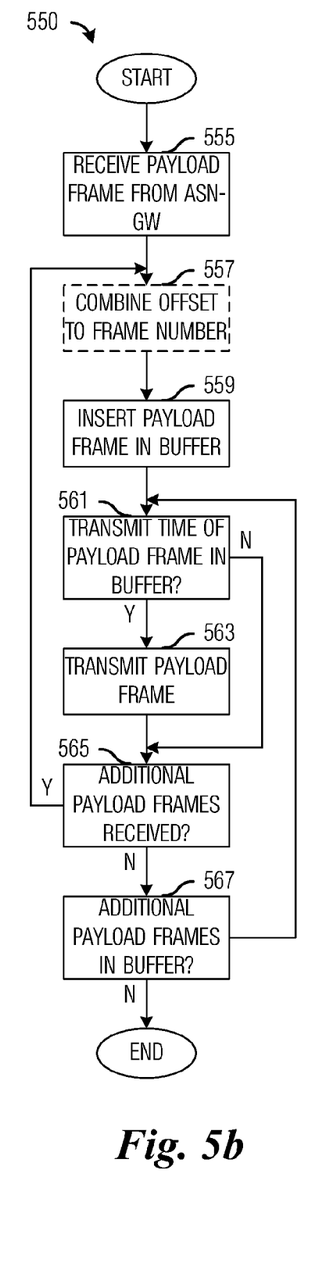
FIG. 5b is a flow diagram of a sequence of events in the transmission of data payload frames at a base station.

FIG. 5b is a flow diagram illustrating a sequence of events 550 in the transmission of data payload frames at a base station, such as base station 210. The transmission of data payload frames at base station 210 may be descriptive of events occurring in base station 210 as base station 210 receives a data payload frame from an ASN-GW, such as ASN-GW 209, and transmits the data payload frame to mobile stations, such as mobile station 215. The transmission of data payload frames may continue as long as base station 210 receives data payload frames or as long as base station 210 has queued data payload frames.

The transmission of data payload frames may begin with base station 210 receiving a data payload frame from ASN-GW 209 (block 555). As base station 210 receives the data payload frame, base station 210 may check to determine if the data payload frame has a frame number that includes an offset, such as offset 315. If the frame number does not include offset 315, then base station 210 may combine (e.g., add or concatenate) the offset to the frame number (block 557). If a MBS controller/server, such as MBS controller/server 207, or an ASN-GW, such as ASN-GW 209, has already combined offset 315 with the frame number, then block 557 may not be necessary.

Base station 210 may then insert the data payload frame in a frame buffer, such as frame buffer 400 (block 559). The data payload frame may be inserted into a slot of frame buffer 400 corresponding to a transmit time of the data payload frame (i.e., the frame number of the data payload buffer). Base station 210 may also check frame buffer 400 for any data payload frames that may need to be transmitted (block 561). If there is such a data payload frame in frame buffer 400, then base station 210 may transmit the data payload frame (block 563).

If there is no such data payload frame or after base station 210 has transmitted the data payload frame, then base station 210 may perform a check to determine if it has received additional data payload frames (block 565). If base station 210 has received additional data payload frames, then base station 210 may continue with combining the frame number with offset 315 (if necessary) and inserting the data payload frame into frame buffer 400. If base station 210 has not received additional data payload frames, then base station 210 may check to determine if there are additional data payload frames in frame buffer 400 (block 567). If there are additional data payload frames in frame buffer 400, then base station 210 may continue with checking to determine if it is time to transmit a data payload frame in frame buffer 400. If there are no additional data payload frames in frame buffer 400, then base station 210 may terminate the transmission of data payload frames.

Figure 5C:
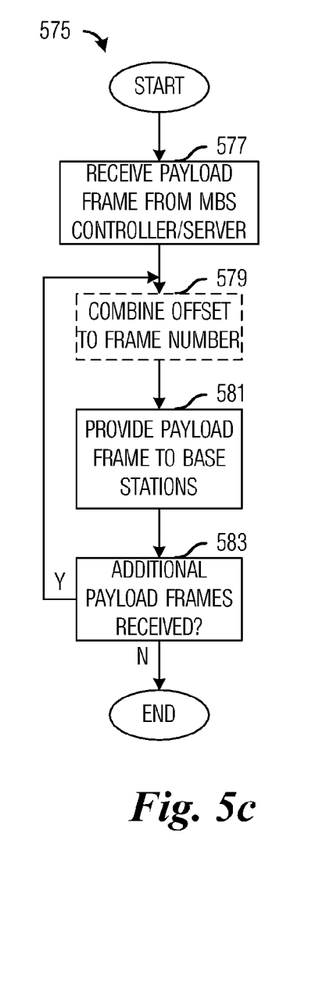
FIG. 5c is a flow diagram of a sequence of events in the processing of data payload frames at an access service network gateway (ASN-GW)

FIG. 5c is a flow diagram illustrating a sequence of events 575 in the processing of data payload frames at an ASN-GW, such as ASN-GW 209. The processing of data payload frames at ASN-GW 209 may be descriptive of events occurring in ASN-GW 209 as ASN-GW 209 receives a data payload frame from a MBS controller/server, such as MBS controller/server 207, and transmits the data payload frame to base stations, such as base station 210.

The processing of data payload frames may begin with ASN-GW 209 receiving a data payload frame from MBS controller/server 207 (block 577). As ASN-GW 209 receives the data payload frame, ASN-GW 209 may check to determine if the data payload frame has a frame number that includes an offset, such as offset 315. If the frame number does not include offset 315, then ASN-GW 209 may combine (e.g., add or concatenate) the offset to the frame number (block 579). If a MBS controller/server, such as MBS controller/server 207, has already combined offset 315 with the frame number, or if offset 315 is to be combined at a later time then block 579 may not be necessary.

ASN-GW 209 may then provide the data payload frame to base stations in wireless access system, such as wireless access system 200 (block 581). Then ASN-GW 209 may perform a check to determine if it has received additional data payload frame (block 583). If ASN-GW 209 has received additional data payload frames, then ASN-GW 209 may continue with combining the offset 315 with frame numbers of the additional data payload frames (if necessary), else the processing of data payload frames may terminate or suspend until additional data payload frames are received.

An offset, such as offset 315, may be either static or dynamic in nature. A static offset may be determined a priori and stored in a memory for subsequent use, while a dynamic offset may be determined while a wireless access system, such as wireless access system 200, is in use. The static offset may be determined during an initial configuration of wireless access system 200, at power up of wireless access system 200, when additional components are added to wireless access system 200, and so forth. In addition to being computed during an initial configuration of wireless access system 200, at power up of wireless access system 200, when additional components are added to wireless access system 200, and so on, the dynamic offset may be computed while wireless access system 200 is in normal operation, such as periodically, prior to starting a multicast/broadcast, when a metric of network performance reaches a threshold, and so forth.

The offset, either static or dynamic, may be provided to a component of wireless access system 200 responsible for combining the offset with the reference time portion of the frame number to produce a frame number. For example, the offset may be provided to MBS controller/server 207, ASN-GW 209, or each of the base stations in the wireless access system 200.

As discussed previously, an offset (either static or dynamic) may be used in the generation of a frame number for a data payload frame at a number of locations in a wireless access system. For example, the offset may be used in the generation of the frame number at a MBS controller/server, ASN-GW, or at a base station. Using the offset in the generation of the frame number at the MBS controller/server may be advantageous in that a portion of the frame number is already being generated at the MBS controller/server and it may be a natural point to complete the generation of the frame number. Furthermore, it may eliminate a need to have additional hardware and/or software at base stations to generate the frame number using the offset. Using the offset in the generation of the frame number at the ASN-GW may be advantageous in that the ASN-GW may be part of an access system of wireless access system 200, therefore it may have better visibility on the configuration of wireless access system 200, for example, characteristics of base stations in wireless access system 200, and so on. Using the offset in the generation of the frame number at a base station may be advantageous in that it reduces the amount of work that may need to be performed by the MBS controller/server and/or ASN-GW, freeing them to perform other operations.

In addition to using either static or dynamic offsets, a decision may be made regarding on which component of the wireless access system will manage the offset. Possible components for managing the offset include the MBS controller/server, the ASN-GW, or the O&M server.

For a static offset, there may be three different scenarios for offset management; the offset may be managed at: MBS controller/server, ASN-GW, or O&M server. With MBS controller/server management, the static offset may be provided to the MBS controller/server and when the MBS controller/server generates a data payload frame from a data payload, the MBS controller/server may generate a frame number for the data payload frame using a reference time for the data payload frame as well as the static offset. With ASN-GW management, the static offset may be provided to the ASN-GW, which may provide the static offset to base stations in the wireless access system. Then, as the ASN-GW receives data payload frames (with frame numbers containing only a reference time portion) and forwards the data payload frames to the base stations, the base stations may combine the static offset with the reference time portion of the frame number. With O&M server management, the static offset may be provided to the O&M server, which may provide the static offset to the base stations. Then, as the base stations receive data payload frames (with frame numbers containing only a reference time portion), the base stations may combine the static offset with the reference time portion of the frame number.

For a dynamic offset, there may be two scenarios for offset management, the offset may be managed at: MBS controller/server or O&M server. In both scenarios, both the MBS controller/server and the ASN-GW may be involved in computing the dynamic offset. With MBS controller/server management, the MBS controller/server may measure a first part of the dynamic offset while the ASN-GW may measure a second part of the dynamic offset.

Figure 6:
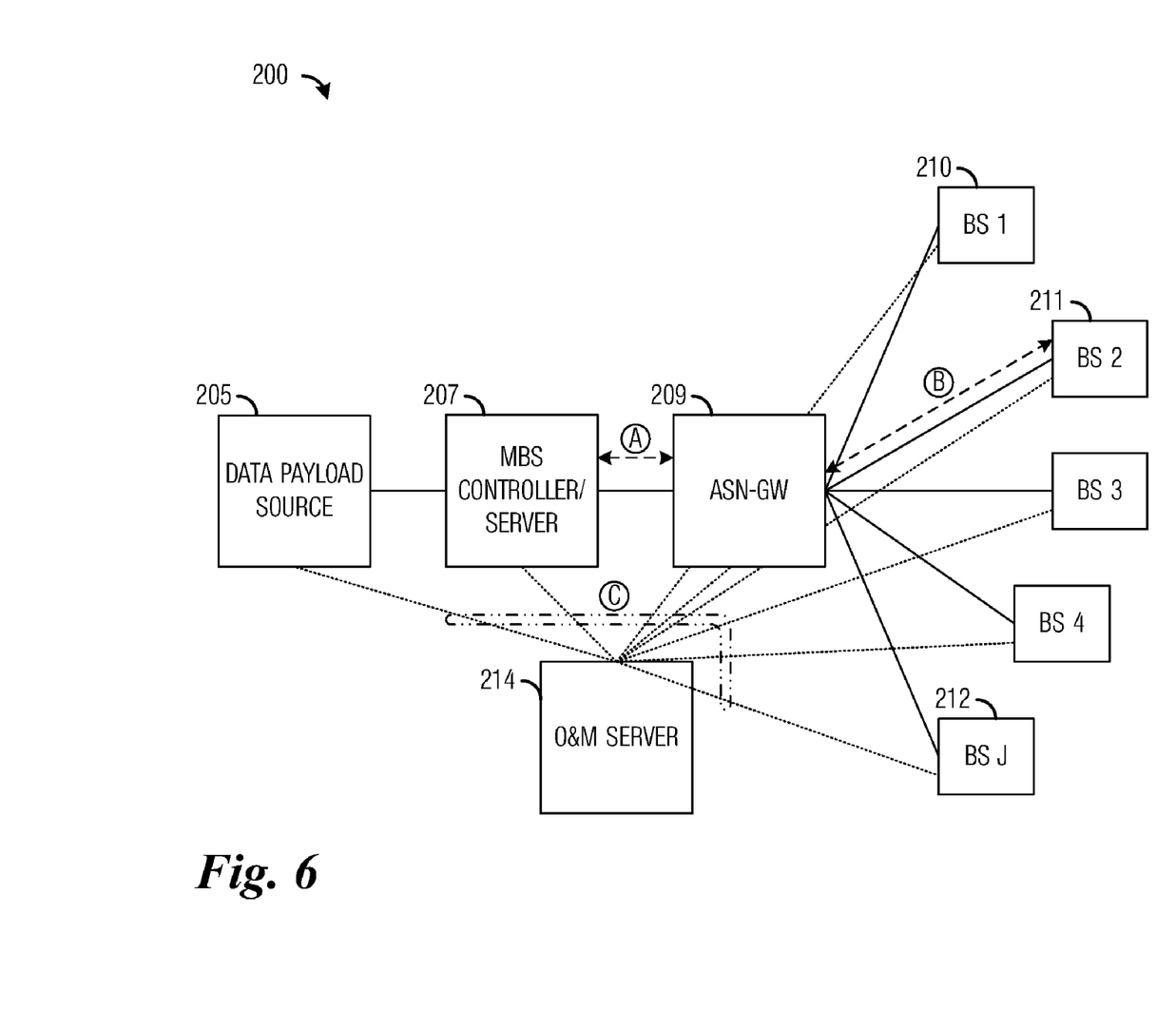
FIG. 6 is a diagram of a wireless access system displaying a measurement of an offset.

FIG. 6 is a diagram illustrating a wireless communications network, such as wireless communications network 200. As shown in FIG. 6, the first part of the dynamic offset (the dynamic offset between MBS controller/server 207 and ASN-GW 209) is highlighted at dashed line A and the second part of the dynamic offset (the dynamic offset between ASN-GW 209 and a base station, such as base station 211) is highlighted as dashed line B. MBS controller/server 207 may be used to measure the first part of the dynamic offset, while ASN-GW 209 may be used to measure the second part of the dynamic offset.

The ASN-GW may then provide its measurement result to the MBS controller/server, which may then combine the two parts to produce the dynamic offset. The ASN-GW may also keep the measurement result and receive MBS controller/server's measurement result and combine the two parts to produce the dynamic offset on its own.

With O&M server management, the MBS controller/server may measure a first part of the dynamic offset while the ASN-GW may measure a second part of the dynamic offset. FIG. 6 also shows communications between O&M server 214 and other components of wireless communications network 200 as dotted lines, such as dotted line grouping C. The MBS controller/server and the ASN-GW may provide their respective results to the O&M server, which may then combine the two parts to produce the dynamic offset.

As discussed above, the dynamic offset may be managed at the MBS controller/server, the ASN-GW, or the O&M server. An advantage of dynamic offset management at the MBS controller/server may be that since the MBS controller/server is already responsible for computing at least a portion of the transmission time of a data payload frame, it may be a ready extension for the MBS controller/server to manage the adding of the offset. An advantage of dynamic offset management at the ASN-GW may be that the ASN-GW is part of the access network, it may be able to more readily get access to the topology of the base stations, as well as information and connectivity type related to the base stations. Additionally, since the ASN-GW is connected to the base stations and to the MBS controller/server, the ASN-GW may perform delay measurements involving the base stations and the MBS controller/server. An advantage of dynamic offset management at the O&M server may be that the O&M server may have a better visibility of connectivity information related to the base stations, the ASN-GW, and the MBS controller/server. The better visibility of the O&M server may allow it to more readily obtain measurements, relay information, and so forth. Furthermore, the O&M server would know if network reconfiguration has taken place and may initiate a new measurement of the dynamic offset if needed.

Figure 7A:
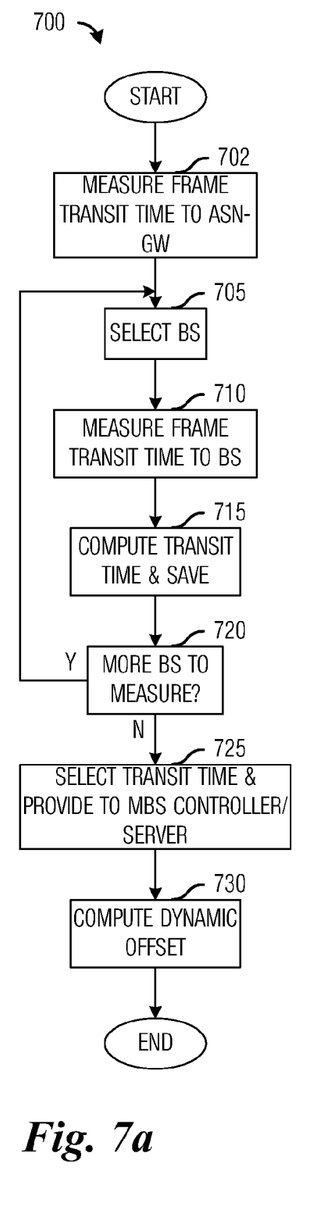
FIG. 7a is a flow diagram of a sequence of events in the computing of a dynamic offset with a MBS controller/server maintaining the dynamic offset.

FIG. 7a is a flow diagram illustrating a sequence of events 700 in the computing of a dynamic offset with a MBS controller/server, such as MBS controller/server 207, maintaining the dynamic offset. As discussed above, the computing of the dynamic offset with MBS controller/server 207 maintaining the dynamic offset may occur at a variety of times, including during setup and configuration, periodically, when a specified event occurs, and so forth.

The computing of the dynamic offset may be performed in two stages, with a first stage being a measurement of a data payload frame transit time from MBS controller/server 207 to ASN-GW 209, which may be a point-to-point connection (block 702). The measurement of the data payload frame transit time may be performed using an Internet control message protocol (ICMP) ping message. The ICMP ping message may be transmitted by MBS controller/server 207 to ASN-GW 209 and ASN-GW 209 may return a response to MBS controller/server 207. The data payload frame transit time may be computed from an elapsed time that may be computed automatically as part of the ICMP. Alternatively, ASN-GW 209 may transmit an ICMP ping message to MBS controller/server 207.

In order to help ensure an accurate measurement of the frame transmit time, the ICMP ping message may be given a same level of priority as a data payload frame. For example, if quality of service (QoS) requirements are used in the transmission of the data payload frame, then the same QoS requirements may be used with the ICMP ping message. Furthermore, the ICMP ping message may be configured so that it would have the same physical size as a data payload frame. Having the ICMP ping message the same size as a data payload frame may help to accurately model size dependent portions of the frame transmit time (e.g., a multiplexing delay and a transmission delay). To further improve offset measurement accuracy, several ICMP ping messages may be used and an average of the elapsed time may be used to compute the data payload frame transit time. Additionally, the ICMP ping messages may be spread out in time so that the use of one ICMP ping message does not impact the use of other ICMP ping messages. In an alternative embodiment, the spreading of the transmission of the ICMP ping messages may be spread out in a manner that simulates the data payload frames are transmitted. For example, if data payload frames are transmitted every 5 milliseconds, then the ICMP ping messages used in delay measurements may also be transmitted every 5 milliseconds while the delay measurement is taking place.

In an alternative embodiment, rather than measuring the data payload frame transit time, ASN-GW 209 may measure a transit time of a small message and then compute the data payload frame transit time from the measured transit time of the small message. For example, a transit time of an ICMP ping message with no data and only control information may be measured. Then, using the measured transit time of the ICMP ping message with no data and only control information, ASN-GW 209 may compute a data payload frame transit time for a data payload frame, which comprises both data and control information.

A second stage may begin with ASN-GW 209 selecting a base station in a wireless access system, such as wireless access system 200 (block 705). Then ASN-GW 209 may measure a data payload frame transmit time from ASN-GW 209 to the selected base station (block 710). ASN-GW 209 may measure the data payload frame transmit time to the selected base station through the use of an ICMP ping message, similar to the ICMP ping message used in the first stage. The ICMP ping message may be transmitted to the selected station and the selected base station may return to a response to ASN-GW 209. The data payload frame transit time may be computed from an elapsed time that may be computed automatically as part of the ICMP and saved (block 715).

After the data payload frame transit time has been computed for the selected base station, ASN-GW 209 may check to determine if there are additional base stations in wireless access system 200 remaining to be measured (block 720). If there are more base stations to measure, then ASN-GW 209 may select another base station and the data payload frame transit time may be measured for the newly selected base station. If there are no more base stations to measure, then ASN-GW 209 may select a largest measured data payload frame transit time between ASN-GW 209 and a base station, and provide the largest measured data payload frame transit time to MBS controller/server 207 (block 725), where MBS controller/server 207 may compute the dynamic offset from the largest measured data payload frame transit time and the data payload frame transit time from MBS controller/server 207 to ASN-GW 209 (block 730) and then the computing of the dynamic offset may terminate. As discussed previously, the dynamic offset may also include an additional time for unexpected delays.

Figure 7B:
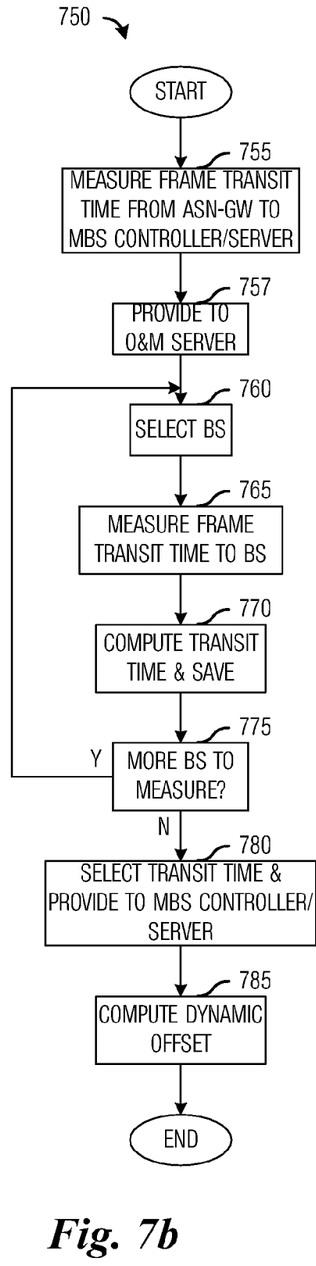
FIG. 7b is a flow diagram illustrating a sequence of events 750 in the computing of a dynamic offset with an operation and maintenance (O&M) server maintaining the dynamic offset.

FIG. 7b is a flow diagram illustrating a sequence of events 750 in the computing of a dynamic offset with an O&M server, such as O&M server 214, maintaining the dynamic offset. As discussed above, the computing of the dynamic offset with the O&M server maintaining the dynamic offset may occur at a variety of times, including during setup and configuration, periodically, when a specified event occurs, and so forth.

The computing of the dynamic offset may be performed in two stages, with a first stage being a measurement of a data payload frame transit time from ASN-GW 209 to MBS controller/server 207, which may be a point-to-point connection (block 755). The measurement of the data payload frame transit time may be performed using an Internet control message protocol (ICMP) ping message. The ICMP ping message may be transmitted by ASN-GW 209 to MBS controller/server 207 and MBS controller/server 207 may return a response to ASN-GW 209. The data payload frame transit time may be computed from an elapsed time that may be computed automatically as part of the ICMP. The data payload frame transmit time may then be provided to the O&M server (block 757). Alternatively, MBS controller/server 207 may transmit an ICMP ping message to ASN-GW 209 instead of ASN-GW 209 transmitting an ICMP ping message to MBS controller/server 207 and the data payload frame transit time may be computed from an elapsed time of the ICMP ping message.

A second stage may begin with ASN-GW 209 selecting a base station in a wireless access system, such as wireless access system 200 (block 760). Then ASN-GW 209 may measure a data payload frame transmit time from ASN-GW 209 to the selected base station (block 765). ASN-GW 209 may measure the data payload frame transmit time to the selected base station through the use of an ICMP ping message, similar to the ICMP ping message used in the first stage. The ICMP ping message may be transmitted to the selected station and the selected base station may return a response to ASN-GW 209. The data payload frame transit time between ASN-GW 209 and the selected base station may be computed from an elapsed time that may be computed automatically as part of the ICMP (block 770).

After the data payload frame transit time has been computed for the selected base station, ASN-GW 209 may check to determine if there are additional base stations in wireless access system 200 remaining to be measured (block 775). If there are more base stations to measure, then ASN-GW 209 may select another base station and the data payload frame transit time may be measured for the newly selected base station. If there are no more base stations to measure, then ASN-GW 209 may select a largest measured data payload frame transit time, and provide the largest measured data payload frame transit time to the O&M server (block 780), where the O&M server may compute the dynamic offset from the largest measured data payload frame transit time and the data payload frame transit time from MBS controller/server 207 to ASN-GW 209 (block 785), and the computing of the dynamic offset may terminate. As discussed previously, the dynamic offset may also include an additional time for unexpected delays.

Figure 8:
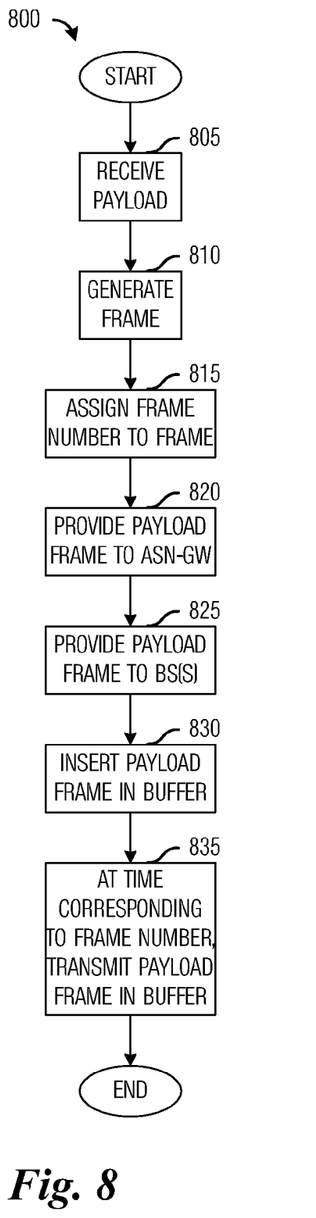
FIG. 8 is a flow diagram illustrating a sequence of events 800 in the multicast/broadcast of a data payload in a wireless access system.

FIG. 8 is a flow diagram illustrating a sequence of events 800 in the multicast/broadcast of a data payload in a wireless access system, such as wireless access system 200. Sequence of events 800 is illustrative of components of wireless access system 200 in multicasting/broadcasting of a data payload to a number of mobile stations providing macrodiversity. The multicast/broadcast of a data payload may begin as the data payload is received and may continue until the data payload is complete, or until wireless access system 200 is reset, powered down, or so on.

The multicast/broadcast of a data payload may begin as a MBS controller/server, such as MBS controller/server 207, begins to receive the data payload (block 805). The data payload may be provided by a data payload source, such as data payload source 205. When MBS controller/server 207 receives enough of the data payload to complete a data payload frame, MBS controller/server 207 may partition the data payload to create a data payload frame (block 810). After creating the data payload frame, MBS controller/server 207 may then assign a frame number to the data payload frame (block 815). The frame number includes at least a value based on a time when the data payload frame was created (a reference time portion) by MBS controller/server 207. The reference time portion may be a relative time and may be based on a reference time, such as the GPS time. The frame number may also include an offset that combined with the time specifies a transmission time for the data payload frame by base stations in wireless communications network 200. The offset may be combined with the creation time by MBS controller/server 207, by an ASN-GW, or at a later time by a base station.

After the frame number (with or without the offset) has been assigned to the data payload frame, the data payload frame may be provided to an ASN-GW, such as ASN-GW 209 (block 820). If the frame number of the data payload frame does not include the offset, the ASN-GW 209 may combine the offset with the reference time portion producing the frame number. ASN-GW 209 may then provide the data payload frame to base station in wireless communications network 200 (825). Since different transport mediums with different data rate capabilities may be used to connect ASN-GW 209 to the base stations, the data payload frame may arrive at the base stations at different times.

When the data payload frame arrives at a base station, the base station may insert the data payload frame into a frame buffer, such as frame buffer 400 (block 830). The data payload frame may be inserted into a position in frame buffer 400 based on the data payload frame's frame number. If the frame number does not include the offset, the base station may combine the offset and the reference time portion prior to inserting the data payload frame into frame buffer 400. Then, at a time corresponding to a transmission time for the data payload frame, as specified by the frame number, the data payload frame may be transmitted to a mobile station(s) (block 835). The multicast/broadcast of data payload frames may continue until all data payload frames have been transmitted and the data payload exhausted or until the multicast/broadcast is stopped or otherwise interrupted.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmission synchronization in a wireless access system having a controller and a plurality of base stations, the method comprising: generating, by the controller, a data payload frame from a data payload; assigning, by the controller, a frame number to the data payload frame, wherein the frame number comprises a generating time of the data payload frame and an offset, wherein the offset spans a transfer time of a data payload frame from the controller to the plurality of base stations, wherein a first part of the offset spans a transfer time of the data payload frame from the controller to a gateway, and wherein a second part of the offset spans a transfer time of the data payload frame from the gateway to one of the plurality of base stations; and distributing, by the controller via the gateway, the data payload frame with the frame number to the plurality of base stations in the wireless access system; wherein, for each base station of the plurality of base stations, a saved second part of the offset is replaced with a measured second part of the offset when the measured second part of the offset is greater than the saved second part of the offset; and wherein the offset is computed from the first part of the offset and the saved second part of the offset.

2. The method of claim 1, wherein the generating a data payload frame comprises portioning the data payload into parts substantially equal to a data portion of the data payload frame.

3. The method of claim 1, wherein the frame number comprises the generating time added to or concatenated with the offset.

4. The method of claim 1, wherein the generating time is a time relative to a periodic reference signal from a time source.

5. The method of claim 4, wherein the time source is selected from the group consisting of: a global positioning system (GPS) time, a network time protocol (NTP) reference time, coordinated universal time (UTC), a system clock from a cellular telephone system, a system clock from a satellite based positioning system, an atomic clock, and combinations thereof.

6. The method of claim 1, wherein the offset is a time value specified in a number of data payload frame transmission times.

7. The method of claim 6, wherein the transfer time comprises a total time from when the data payload frame is generated at the controller to when the data payload frame is received in its entirety at the plurality of base stations.

8. The method of claim 7, wherein the offset is greater than a largest transfer time between the controller and any one base station in the plurality of base stations.

9. The method of claim 1, wherein the offset further comprises an additional time to compensate for unexpected delays.

10. The method of claim 1, wherein the offset is a specified value.

11. The method of claim 1, wherein the offset is measured dynamically while the wireless access system is in operation.

12. The method of claim 11, wherein the offset is measured using an Internet control message protocol (ICMP) ping message.

13. The method of claim 1, wherein the frame number is equal to the generating time combined with the offset.

14. The method of claim 1, wherein the frame number comprises a value based on the generating time of the data payload frame.

15. A method for transmission synchronization in a wireless access system having a controller and a plurality of base stations, the method comprising: wherein, for each base station of the plurality of base stations, a saved second part of an offset is replaced with a measured second part of the offset when the measured second part of the offset is greater than the saved second part of the offset, wherein the offset spans a transfer time of a data payload frame from the controller to the plurality of base stations, wherein a first part of the offset spans a transfer time of the data payload frame from the controller to a gateway, and wherein a second part of the offset spans a transfer time of the data payload frame from the gateway to one of the plurality of base stations; wherein the offset is computed from the first part of the offset and the saved second part of the offset; receiving from the controller via the gateway, a data payload frame having a frame number comprising a generating time of the data payload frame; combining the offset to the frame number of the data payload frame in response to determining that the frame number comprises only the generating time; and transmitting the data payload frame at a transmission time determined from the frame number of the data payload frame.

16. The method of claim 15, wherein the offset is greater than a largest transfer time between the controller and any one base station in the plurality of base stations, and wherein the transfer time comprises a total time from when the data payload frame is generated at the controller to when the data payload frame is received in its entirety at the plurality of base stations.

17. The method of claim 15, wherein the transmission time is equal to the generating time combined with the offset.

18. The method of claim 15, further comprising after the combining, inserting the data payload frame in a frame buffer, wherein the data payload frame is inserted into a position in the frame buffer based on its frame number.

19. A method for transmission synchronization in a wireless access system having a controller, a gateway, and a plurality of base stations, the method comprising, at the gateway: replacing, by the gateway for each of the plurality of base stations, a saved second part of an offset with a measured second part of the offset when the measured second part of the offset is greater than the saved second part of the offset, wherein the offset spans a transfer time of a data payload frame from the controller to the plurality of base stations, wherein a first part of the offset spans a transfer time of the data payload frame from the controller to the gateway, and wherein the second part of the offset spans a transfer time of the data payload frame from the gateway to one of the plurality of base stations; computing, by the gateway, the offset from the first part of the offset and the saved second part of the offset; receiving from the controller, a data payload frame having a frame number comprising a generating time of the data payload frame; combining the offset to the frame number of the data payload frame in response to determining that the frame number comprises only the generating time; and distributing the data payload frame with the frame number to the plurality of base stations in the wireless access system.

20. The method of claim 19, wherein the offset is a specified value.

21. The method of claim 19, wherein the offset is measured dynamically while the wireless access system is in operation.

22. The method of claim 19, wherein the frame number comprises a value based on the generating time of the data payload frame.

23. A method for determining an offset in a wireless access system having a controller, a server, a gateway, and a plurality of base stations, the method comprising: measuring, by the gateway, a first part of the offset, wherein the first part of the offset spans a transfer time of a data payload frame from the controller to the gateway; selecting, by the gateway, a base station from the plurality of base stations; measuring, by the gateway, a second part of the offset, wherein the second part of the offset spans a transfer time of the data payload frame from the gateway to the selected base station; replacing, by the gateway, a saved second part of the offset with the measured second part of the offset in response to determining that the measured second part of the offset is greater than the saved second part of the offset; repeating, by the gateway, the selecting, the measuring a second part, and the replacing for remaining base stations in the plurality of base stations; and computing, by the gateway, the offset from the first part of the offset and the saved second part of the offset.

24. The method of claim 23, wherein the measuring a first part and the measuring a second part each comprises:
   transmitting a message;
   receiving a response to the message; and
   computing a transfer time based on an elapsed time between the transmitting and the receiving.

25. The method of claim 24, wherein the message is an Internet control message protocol (ICMP) ping message.

26. The method of claim 24, wherein the transmitting a message comprises transmitting a plurality of messages, the receiving a response comprises receiving a response for each transmitted message, and the computing a transfer time is based on an average elapsed time between a transmitting of each message and a receiving of a response to each message.

27. The method of claim 26, wherein the transmitting of a plurality of messages comprises transmitting each message in the plurality of messages at a substantially different time.

28. The method of claim 24, wherein the transmitting a message comprises transmitting a plurality of messages, the receiving a response comprises receiving a response for each transmitted message, and the computing a transfer time is based on maximum elapsed time between a transmitting of each message and a receiving of a response to each message.

29. The method of claim 24, wherein a data payload frame is transmitted with a set of quality of service (QoS) requirements, and wherein the message is transmitted with the set of QoS requirements.

30. The method of claim 24, wherein a data payload frame and the message are equal in size.

31. The method of claim 23, further comprising after the computing, adding, by the gateway, an additional time value to the offset, wherein the additional time value provides compensation for unexpected delays.

* * * * *